(12) United States Patent
Noguchi

(10) Patent No.: US 7,241,503 B2
(45) Date of Patent: Jul. 10, 2007

(54) IRIDESCENT PIGMENT HAVING HIGH BRILLIANCE AND HIGH CHROMA

(75) Inventor: Tamio Noguchi, Fukushima-ken (JP)

(73) Assignee: Merck Patent GmbH, Darmstadt (DE)

( * ) Notice: Subject to any disclaimer, the term of this patent is extended or adjusted under 35 U.S.C. 154(b) by 43 days.

(21) Appl. No.: 10/717,926

(22) Filed: Nov. 21, 2003

(65) Prior Publication Data

US 2004/0166316 A1    Aug. 26, 2004

(30) Foreign Application Priority Data

Nov. 21, 2002    (JP)    ............................. 2002-338344

(51) Int. Cl.
*B32B 5/16*    (2006.01)

(52) U.S. Cl. ..................... 428/403; 428/690; 428/702

(58) Field of Classification Search ................ 428/403, 428/690, 702
See application file for complete search history.

(56) References Cited

U.S. PATENT DOCUMENTS

| | | | | |
|---|---|---|---|---|
| 3,087,828 A | * | 4/1963 | Linton | 106/417 |
| 4,086,100 A | * | 4/1978 | Esselborn et al. | 106/417 |
| 4,435,220 A | * | 3/1984 | Watanabe et al. | 106/415 |
| 4,565,581 A | * | 1/1986 | Bernhard | 106/417 |
| 4,744,832 A | * | 5/1988 | Franz et al. | 106/418 |
| 4,867,793 A | * | 9/1989 | Franz et al. | 106/415 |
| 5,223,034 A | * | 6/1993 | Nitta et al. | 106/417 |
| 5,753,371 A | * | 5/1998 | Sullivan et al. | 428/406 |
| 6,132,873 A | * | 10/2000 | Dietz et al. | 428/404 |
| 6,156,115 A | * | 12/2000 | Pfaff et al. | 106/403 |
| 6,280,520 B1 | * | 8/2001 | Andes et al. | 106/415 |
| 6,596,070 B1 | * | 7/2003 | Schmidt et al. | 106/417 |
| 6,630,018 B2 | * | 10/2003 | Bauer et al. | 106/415 |
| 6,747,073 B1 | * | 6/2004 | Pfaff et al. | 523/171 |

OTHER PUBLICATIONS

The Mearl Corporation, "Cloisonne Regal Gold, Product specification and properties", May 1992.*
The Mearl Corporation, "Flamenco Twilight Gold, Product specification and properties", Mar. 1992.*
Plaff et al., "Angle-Dependent Optical Effects Deriving from Submicron Structures of Films and Pigments", Chem. Rev. 1999, 1963-81.*

* cited by examiner

*Primary Examiner*—H. Thi Le
(74) *Attorney, Agent, or Firm*—Millen, White, Zelano & Branigan, P.C.

(57) ABSTRACT

An iridescent multilayer pigment having at least two or more layers of metal oxides containing one or more metals selected from Ce, Sn, Ti, Fe, Zn and Zr which are coated onto the surface of thin platelet-like substrates. The inventive pigments show high brilliance and high chroma, in particular in cases in which thin platelet-like substrates having a fine average particle diameter are used. The pigment is useful in paints, printing inks, lacquers, plastics, dopants for laser marking, non-dusting pigment products, non-dusting pigment granules or cosmetics.

28 Claims, No Drawings

IRIDESCENT PIGMENT HAVING HIGH BRILLIANCE AND HIGH CHROMA

The present invention relates to an iridescent pigment having high brilliance and high chroma, and in particular relates to an iridescent pigment exhibiting excellent brilliance and chroma. Use of a thin platelet-like substrate having a fine particle diameter preferred. The present invention further relates to a preparation method for the same and the use thereof.

Iridescent pigments (pearl-luster pigments) exhibiting pearl luster using mica etc. as thin platelet-like substrates, e.g., platelet-shaped substrates, on the surface of which titanium oxide, iron oxide, etc. is formed as a metal oxide coating layer having a high refractive index have hitherto been known and widely used in plastics, paints, inks, cosmetics, etc. Such iridescent pigments exhibit color by means of the interference effect of the reflected light from the surface of the metal oxide coating layer having a high refractive index and the reflected light from the boundaries of the coating layer and the thin platelet-like substrates (JP-B-43-25644 and JP-B-49-3824).

Conventional iridescent pigments are those using thin platelet-like substrates of mica etc. with an average particle diameter of 2 to 100 μm, a metal oxide such as titanium oxide and/or iron oxide etc. is coated thereon; these pigments do not however have sufficient brilliance and chroma. The causes for this can be divided into 1) a natural cause which comes from the particle shape of the fact that luster decreases as a result of the increase of the ratio of light scattering due to the increase of particle edges along with the reduction of the particle diameter and the relative decrease of the ratio of parallel light reflected from the thin platelet-like particle planes surface; and 2) a technical cause, based on the coating conditions and method, which has its origin in the insufficient smoothness of the reflective surface, i.e. the surface of the coated layer because, when coating metal hydrates which are the precursors of the coated metal oxides, the particles of the thin platelet-like substrates are agglomerated, these overlapped parts are not coated with metal hydrates and the density of the metal oxide coating layer is not sufficient (the optical refractive index is reduced because of the existence of roughly coated parts).

Thus, it naturally gets more difficult to obtain a uniformed metal oxide coating layer on the particle surface of each thin platelet-like substrate as the thin plated-like particle is finer, the interfacial energy is bigger, its agglomeration is increased. Therefore, the pearl-luster pigments obtained cannot exhibit sufficient brilliance and chroma.

Much research and development for increasing brilliance and for improving the chroma of interference colors has already been conducted and disclosed. For example, pigments to which sintering aids are added in the production process in order to increase the refractive index of the coated metal oxides (JP-A-10-279828), pigments in which the crystals of the coated metal oxide particles are altered in order to increase the optical refractive index (change to rutile-type coated $TiO_2$) (JP-B-54-34010, JP-B-56-43068 and JP-A-62-34963), and multiple coating layer pigments with various metal oxides designed to improve brilliance by multiplying interference by increasing the number of coating layer interfaces and the light reflecting area (JP-A-2000-501774, JP-A-2000-517374, and JP-A-2001-5210296) have been disclosed.

However, with decreasing particle diameter of the thin platelet-like substrates, a sufficient effect with satisfactory brilliance and chroma cannot be obtained by these techniques either.

On the other hand, in the market actually, it is increased the demands, such as an iridescent pigments without particle feeling with a depth feeling especially in the painting sector use and the demand for iridescent pigments with fine particle diameter exhibiting high brilliance and high chroma in the ink sectors use in which the particle size is restricted such as the offset printing and writing appliance ink sector.

Thus, an object of the present invention is to solve the above-mentioned problems of the prior art and to provide an iridescent pigment exhibiting high brilliance and high chroma in particular even in cases that thin platelet-like substrates having a fine average particle diameter are used.

The inventors found that by forming a plurality of metal hydrate layers consisting mainly of specific metals on thin platelet-like substrates, it is possible to obtain a homogeneous metal hydrate coating layer on the surface of the thin platelet-like substrates by reducing the agglomeration of the thin platelet-like substrates and that it is possible to improve the refractive index by reducing the pore amount of the coating layer.

Thus, the present invention relates to an iridescent pigment wherein multilayer coats having at least two or more layers of metal oxides comprising one or more metals selected from the group consisting of Ce, Sn, Ti, Fe, Zn and Zr is coated onto the surface of thin platelet-like substrates.

The present invention further relates to the above-mentioned iridescent pigment wherein the lowest layer of the multilayer coats is a metal oxide layer comprising metals selected from the group consisting of Ce, Sn and Fe and wherein said multilayer coats comprises one or more multilayer units made from a metal oxide layer comprising Sn and attached to the upper face thereof a metal oxide layer comprising Ti.

The present invention also relates to the above-mentioned iridescent pigment wherein the lowest layer is a metal oxide layer comprising Sn and attached to the upper face thereof a metal oxide layer comprising Ti.

The present invention further relates to the above-mentioned iridescent pigment wherein the multilayer coats has a metal oxide layer comprising an alkali metal and/or an alkaline earth metal.

The present invention also relates to the above-mentioned iridescent pigment wherein the alkaline earth metal is Mg and/or Ca.

The present invention further relates to the above-mentioned iridescent pigment wherein the specific surface area is 10 $m^2$/g or less and the pore amount is 0.006 ml or less for each 1 $m^2$ of the surface area of the thin platelet-like substrate.

The present invention also relates to the above-mentioned iridescent pigment wherein the thin platelet-like substrate is selected from the group consisting of mica, synthetic mica, silica flakes, alumina flakes, glass flakes, BiOCl flakes, thin platelet-like iron oxide and metal flakes.

The present invention further relates to a preparation method for an iridescent pigment containing therein thin platelet-like substrates are treated to be high dispersed suspension is obtained by adding water-soluble polymers and/or water-soluble nitrogen compounds to a suspension of said substrates and therein, thereafter, a metal hydrate layer is coated onto the surface of the treated substrates by adding metal salts and a basic aqueous solution to said suspension.

The present invention also relates to the above-mentioned preparation method containing therein an aqueous solution of alkali metal compounds and/or alkaline earth metal compounds is additionally added simultaneously with adding metal salts and a basic solution or directly thereafter.

The present invention further relates to the above-mentioned preparation method wherein the water-soluble polymer is polyethylene glycol.

The present invention also relates to an iridescent pigment obtained by the above-mentioned preparation method.

The present invention further relates to the use of the above-mentioned iridescent pigment in paints, printing inks, plastics, dopants for laser marking, non-dusting pigment products, non-dusting pigment granules or cosmetics.

The present invention, by adopting a specific structure wherein multiple layers of metal oxides comprising a specific metal are coated onto the surface of a thin platelet-like substrate, provides an iridescent pigment having high brilliance and high chroma, wherein the coating layers coated onto the thin platelet-like substrate are homogeneous, which realizes high brilliance and high chroma in particular even in cases that thin platelet-like substrates having a small average particle diameter are used. The iridescent pigment according to the present invention realizes high brilliance and high chroma because of a smooth surface characterized in that the pore amount is reduced and small metal oxide particles in the nanometer range are densely and uniformly coated onto the substrate surface.

Further, the method according to the present invention, wherein metal oxide layers are coated onto the surface of a thin platelet-like substrate by means of a simple wet process method, makes it possible to produce the above-mentioned iridescent pigment having high brilliance and high chroma. According to the method of the present invention, it is possible to obtain a surprisingly uniformly coating layer on the surface of a thin platelet-like substrate by reducing the agglomeration of the thin platelet-like substrates, even with thin platelet-like substrates having a fine particle diameter. In conventional methods for producing iridescent pigments, wherein metal hydrates from an aqueous solution of metal salts and a basic solution are coated under acidic conditions of pH 1.5 to pH 3.0 onto thin platelet-like substrates by suspending the thin platelet-like substrates having fine particles with an average particle diameter of 30 µm or less such as mica in water, it is difficult to uniformly coat metal hydrates onto a mica surface since mica agglomerates because being near to its isoelectric point (the isoelectric point of muscovite: pH=0.95) to this coating pH. There is also the problem that the isoelectric point of the coated metal hydrates is also close (the isoelectric point of $TiO_2$ (rutile): pH=4.7) to this coating pH and that it is impossible to coat a thin layer onto the mica surface because the metal hydrates also agglomerate.

On the other hand, according to the method of the present invention, it is possible to surprisingly increase the dispersion stability of the suspension of thin platelet-like substrates by adsorbing surfactants and water-soluble polymers on the surface of the thin platelet-like substrates. Further, by the chelating action of surfactants and water-soluble polymer compounds with metal ions, it is possible to coat dense primary metal hydrate particles on the surface of thin platelet-like substrate and to produce an iridescent pigment having high brilliance and high chroma.

Hereinafter, the present invention along with the preparation method adopted therein will be explained in greater detail.

(1) Process A: Adding Water-Soluble Polymers or Water-Soluble Nitrogen Compounds to a Suspension of Thin Platelet-Like Substrates and Heating It (Surface Treatment of the Thin Platelet-Like Substrate)

In this process, the surface of thin platelet-like substrates is treated by suspending the thin platelet-like substrates in water and by adding water-soluble polymers and/or water-soluble nitrogen compounds thereto. Due to this process the dispersibility of the thin platelet-like substrates in an aqueous solution can be increased.

Examples of thin platelet-like substrates used in the present invention include mica, synthetic mica, silica flakes, alumina flakes, glass flakes, BiOCl flakes, thin platelet-like iron oxide (MIO: micaceous iron oxide), various metal flakes, passivated metal flakes (e.g., passivated aluminum flakes and passivated titanium flakes), stainless steel flakes, graphite, etc. An example of the use of silica flakes is in JP-A-07-500366, an example of the use of alumina flakes is in JP-A-07-260959, and an example of the use of passivated aluminum flakes is in Japanese Patent Application No. 2001-234461. Mica is preferred because of its easy availability and its wide use. In sectors where hiding power is required, opaque thin platelet-like substrates, such as various metal flakes, passivated metal flakes (Japanese Patent Application No. 2001-234461), graphite, etc., are preferred.

The size of the particle diameter of the thin platelet-like substrate used can be selected at will in the range adopted for conventional iridescent pigments; however, particles having an average diameter of 2 to 100 µm, an aspect ratio (average diameter to average thickness) of 5 to 200 or a preferred aspect ratio of 10 to 100 are appropriate because of its wide use. The average particle diameter at which the effect of the present invention is particularly evident, compared to conventional iridescent pigments, is 30 µm or less, preferably 20 µm or less and even more preferably 10 µm or less. When the particle diameter decreases, the tendency of the thin platelet-like substrates to agglomerate increases, and for preventing this agglomeration, the effect of the present invention becomes more remarkable.

The thin platelet-like substrate selected above is suspended in water and water-soluble polymers and/or water-soluble nitrogen compounds are added. This is done for the purpose of the surface treatment preventing the agglomeration between the thin platelet-like substrates in the suspension, which is the principal object of the present invention. By this means it is possible to reduce the parts on the surface of the thin platelet-like substrates not coated by metal hydrates in the coating process performed thereafter.

Examples of the water-soluble polymers used in the present invention include water-soluble nonionic surfactants such as the alkylene oxide polymerized one with various alcohols. Examples include for example polyalkylene glycols when bifunctional alcohols such as ethylene glycol and propylene glycol etc. are used. Specific examples include polyethylene glycol and polypropylene glycol as well as random polymers and block polymers thereof. From the viewpoint of water solubility, polymers with many oxyethylene-base structural parts (polymers with good hydrophilic properties) are selected as far as possible as polyethylene glycol random or block polymer. Any of these polymers, as long as it is soluble in water, may be selected. Polyethylene glycol with a molecular weight of 5000 or less is particularly preferred. Water-soluble polymers can be used as an aqueous solution separately prepared beforehand or, if their water solubility is high, they can also be added directly to the suspension. For dissolving the polymers in water, those which are in the liquid state at room temperature are most preferred.

The amount of water-soluble polymers used varies according to the concentration and particle size of the thin platelet-like substrates in the suspension; however, 0.1 to 5 weight parts for 100 weight parts of the thin platelet-like substrates are preferred when thin platelet-like substrates with an average particle diameter of 2 to 100 μm are used. Since the unit surface area increases in cases of fine particle diameters, it may of course be necessary to increase the amount within this range of these particles. In the present invention, it is possible to use water-soluble nitrogen compounds instead of or together with water-soluble polymers.

Examples of water-soluble nitrogen compounds include for example urea, buret, guanidine and water-soluble amines. Water-soluble amines include primary, secondary, tertiary amines, diamines as well as salts thereof and quaternary amine salts. Examples of water-soluble amines include e.g. (poly)hydroxyalkylamine salts, polyoxyethyleneamine salts, hydroxyamine, salts thereof, polyoxyethyleneamine, ethylenediamine and salts thereof. The amount of water-soluble nitrogen compounds used is identical to the amount of water-soluble polymers mentioned above. It is also possible to use the water-soluble polymers together with the water-soluble nitrogen compounds.

Next, the pH is adjusted to a predetermined value for the various aqueous solutions of metal salts added in the following processes (hereinafter called "process B" and "process D") by using mineral acids such as hydrochloric acid, sulfuric acid, nitric acid, etc. or basic compounds of caustic soda and caustic potash, and the temperature is raised to about 85° C. For example, when using Ce salt the pH is adjusted in the range from 7 to 9, for Ti and Sn salts it is adjusted in the range from 1.5 to 2.0 and for Fe salt it is adjusted in the range from 2.5 to 3.5. These pH values are, according to the present invention, the preferred ranges for coating the respective hydrated metal salts onto the thin platelet-like substrates in the future process.

(2) Process B: Simultaneously Adding Metal Salts and Basic Solutions for Coating the Thin Platelet-Like Substrates while Stirring and while Maintaining a Predetermined pH, and Repeating this Process for Each Metal Salt to be Coated In this process the desired types of aqueous solutions of metal salts and basic aqueous solutions that have been prepared separately beforehand are simultaneously added to and hydrolyzed successively and/or repeatedly, as desired, in the suspension of thin platelet-like substrates obtained in process A, and are deposited as a plurality of coating layers of the respective metal hydrates which are the precursors of the metal oxide layers. In this process, the metal hydrate layers to be the multilayer coats are coated onto the thin platelet-like substrates.

Examples of metal salts used in the present invention include Ce salt, Sn salt, Ti salt, Fe salt, Zn salt and Zr salt. Among these, Ce salt, Sn salt and Fe salt are preferred and can be used as the "lowest layer" which is coated directly onto the surface of the thin platelet-like substrates. This is to improve the density of the other metal hydrate layers coated onto this layer. Ti salt, Zr salt and Zn salt are used for coating layers other than the lowest layer with the aim of fully showing interference colors, because the refractive index of metal oxides finally obtained from these metal salts is high and because there is no absorption of light at specific visible wave lengths. Ce salt used in the lowest layer is not only in order to increase density, it can also be used as the other coating layers than it with the aim of showing blue which is the inherent color (masstone) of metal oxides thereof. Sn, too, is not only used in the lowest layer, it can also be used in other coating layers than it for showing interference colors because metal oxides thereof have a high refractive index. As to Fe salt, it, too, is not only used in the lowest layer in order to increase density, it can also be used in other coating layers than it for showing interference colors because metal oxides thereof have a high refractive index; and since the inherent color (masstone) of these metal oxides is red, it can further be used in coating layers other than the lowest layer with the aim of obtaining interference colors and reddish color tones.

Any of the above-mentioned metal salts may be used as long as it is water-soluble. It is understood that chlorides, sulfates, nitrates, and acetates thereof are mainly used. Moreover, in the present invention, it is possible to use these metal salts, even if they are not water-soluble in themselves, in an aqueous solution by using mineral acids and by lowering the pH.

Examples of metal salts used in this process include Ce salts such as cerium chloride, cerium sulfate, cerium nitrate; Sn salts such as tin dichloride, tin tetrachloride, primary and secondary tin sulfate, primary and secondary tin nitrate. Examples of Ti salts include for example titanium tetrachloride, titanyl sulfate, titanium sulfate, titanium trichloride, etc. Examples of Fe salts include primary and secondary iron chloride, primary and secondary iron sulfate, secondary iron nitrate; examples of Zn salts include zinc chloride, zinc sulfate, zinc nitrate; and examples of Zr include zirconium oxychloride, zirconium sulfate and zirconium nitrate.

In the method adopted in the present invention for coating metal hydrates onto the thin platelet-like substrates that have been subjected to a surface treatment in process A, the above-mentioned types of aqueous solutions of metal salts and basic aqueous solutions separately prepared beforehand are simultaneously used and added to a suspension while maintaining a predetermined pH. From the viewpoint of availability, sodium hydroxide and potassium hydroxide are preferably used as basic compounds. It is also possible to use suitable aqueous ammonium solutions and other water-soluble amines etc. However, sodium hydroxide and potassium hydroxide are preferred, because in the present invention they additionally have the role of sintering aids of alkali metal compounds, as described below (in process D). Namely, when alkali metal hydroxides are used as basic compounds, this is not only for adjusting the pH, but also at the same time for the sintering.

The combination of the plurality of metal oxide coating layers preferably adopted in the present invention can be selected at will within the range of the above-mentioned conditions; however, the following case can be particularly given as example.

Namely, the coating according to the present invention which is a plurality of metal oxide coating layers wherein two layers are coated in the order of $SnO_2$ as the lowest layer followed by $TiO_2$, and wherein the multilayer unit made from these two layers ($SnO_2$—$TiO_2$) repeated one or more times is preferred for obtaining the iridescent pigment having high brilliance and high chroma which is an object of the present invention.

To obtain the iridescent pigment made from this combination of layers, predetermined amounts of the precursors, i.e. the aqueous solution of Sn salt and the aqueous solution of Ti salt, for obtaining the desired hues are alternately and successively added to the suspension that has passed process A. The suitable pH range for adding these aqueous solutions of Sn salt and Ti salt is 1.5 to 2.0.

When the hydrated Ti coating layer is formed, the particles diameter of the Ti hydrates is reduced and the Ti hydrates are changed to the rutile-type because of the Sn hydrates existing under this layer. Consequently, by successively coating alternating layers, the layer of Ti hydrates is in contact with Sn salt above and below; therefore the Ti hydrates are changed to the rutile type more effectively than in the prior art and, as a result thereof, it is possible to obtain $TiO_2$ coating layers with a high refractive index. In JP-B-56-43068 cited in the prior art above, the order of the coating layers is rutile/$SnO_2$/rutile; on the contrary to this $SnO_2$, which is coated by using primary tin salt together with an oxidizing agent, the $SnO_2$, used in the present invention as the lowest layer, is different in that secondary tin salt is directly used without using an oxidizing agent, which is effective for forming a dense upper layer and which, at the same time, is also advantageous to have a rutilization activity.

Moreover, a metal oxide coating can be given as example wherein the lowest layer is $CeO_2$ or $Fe_2O_3$ and wherein the upper layers thereof, i.e. a $SnO_2$ layer followed by a $TiO_2$ layer ($SnO_2$—$TiO_2$), are repeated at least one time. For this coating an aqueous solution of Ce salt or an aqueous solution of Fe salt is added, subsequently an aqueous solution of Sn salt followed by an aqueous solution of Ti salt are added. The pH for this coating is determined according to the conditions described above.

When Ce salt is used to generate a blue masstone, the aqueous solution of Ce salt is not only added for the lowest layer, but it can also be used between the other metal hydrate layers coated as upper layers.

The present invention further comprises, as iridescent pigment exhibiting interference colors, a pigment with a multilayer coating combining a $Fe_2O_3$ layer, as the lowest layer, with a $SnO_2$ layer and a $TiO_2$ layer ($SnO_2$—$TiO_2$) coated as upper layers thereon. This iridescent pigment is obtained by using an aqueous solution of Fe salt to produce metal hydrates thereof as the lowest layer and by coating the two types of aqueous solutions of metal salt in any order as upper layers thereon. Preferably, the combination is added in the sequence of Fe salt for the lowest layer, followed by Sn salt and Ti salt repeated at least one time in the order of Sn salt-Ti salt, while maintaining the pH suitable for the production of the respective metal hydrates described above. By using Fe salt abundantly it is further possible to obtain iridescent pigments showing interference colors with reddish masstones. For the purpose of obtaining these masstones, Fe salt is not only used for the lowest layer, but it can also be used in intermediate layers of the $SnO_2$ and $TiO_2$ layers coated as upper layers thereon.

An example of a pigment having a composite metal oxide coating layer is the case in which Fe salt is added for the lowest layer followed by Sn salt and by Fe/Ti salts. Here, "Fe/Ti salts" represent a mixed aqueous solution of Fe salt and Ti salt. In this case, in which the outermost layer is of composite metal oxides of Ti and Fe, the iridescent pigment exhibits an interference color having a masstone of a yellow hue with high brilliance.

In the present invention, the amount of aqueous solution of metal salt added is the amount for obtaining the thickness of the metal oxide coating layer that will exhibit the greatest chroma of the desired interference color. Concretely this means that the color intensity of each hue (the chroma C is calculated according to formula 1 from the value a which is $$\sqrt{a^2+b^2}$$ (Formula 1)

the red-green index and the value b which is the yellow-blue index) is simulated in accordance with the interference principle of light (whereby interference increases due to the phase matching between the surface reflection of light at the wavelength of the intended hue and (each) boundary reflection) by means of computer analysis (e.g. with TF-Calc produced by Software Spectra Inc.). Then the conditions that will produce the greatest chroma of the desired hue are selected and the amount of aqueous solution of metal salt predetermined on the basis of the area to be coated so as to obtain the thickness for the intended hue is added to the suspension. In this way, each of the above-mentioned aqueous solutions of metal salt is added, and the amount of aqueous solution of metal salt is determined on the basis of the chroma actually obtained.

For example, when coating a titanium oxide layer onto e.g. a thin platelet-like substrate of mica with an average particle diameter of 5 μm and showing a yellow interference color, the amount of aqueous solution of titanium salt to obtain a thickness of 200 to 220 nm is added to the suspension. Further, when coating a composite metal oxide layer, the aqueous solution in which the metal salts are mixed is adjusted beforehand and added in the same way as above. In the present invention, in order to form a plurality of the above-mentioned metal hydrate layers, the various types of aqueous solutions of metal salt are adjusted beforehand and added, successively and repeatedly, to the suspension.

(3) Process D: Coating a Hydrate Layer of Alkali Metal Compounds or of Alkaline Earth Metal Compounds at the Same Time or After Adding the Various Types of Metal Salts in Process B This process is an additional process of process B in which an aqueous solution of metal compounds called "sintering aid" is added to accelerate the sintering by means of drying and calcination (described in process C below).

Examples of this sintering aid include alkali metal hydroxides (mentioned above) of Na, K etc., and alkaline earth metal salts of Ca, Mg, etc. As alkaline earth metal salts, chlorides, hydrochlorides and nitrates thereof can be mentioned; however, as long as they are water-soluble when added any of them may be used. Among the alkaline earth metal salts, it is preferred to use Mg salt and Ca salt. In the present invention, preferably the outermost layer of the plurality of metal hydrate layers is coated with a sintering aid. A method of preparation comprises adding a sintering aid simultaneously with the adding of the various types of aqueous solutions of metal salts or directly after adding the respective aqueous solution of metal salt in process B. Having passed through this process, the sintering aid, in the drying and calcination in process C hereafter, produces a sintering effect, reduces the pore amount of the plurality of metal oxide layers and contributes to the increase of the refractive index.

When using the alkali metal salts adopted in the present invention, basic compounds of sodium hydroxide and potassium hydroxide used for adjusting the pH are also included when the various types of aqueous solutions of metal salt are added in process B. These alkali metal hydroxides can also be used in a mixed system. The outermost layer is preferably sintered layer, not only to reduce porosity and increase the refractive index, but also to increase the smoothness of the outermost layer surface and, as a result, to increase the brilliance.

(4) Process C: Filtering, Separating, Washing, Drying and if Desired Calcining the Suspension that has Passed Through Process B or D This process is for filtering, separating, washing, drying and calcining the solid parts in the suspension wherein metal hydrates for calcining have been deposited.

In this process, the iridescent pigment according to the present invention can be obtained by filtering, separating, washing, drying and calcining the suspension that has passed through process B or D. The drying is performed in order to remove free water, while calcination is used to change as many of the metal hydrates of the coated layer as possible into metal oxides. Further, the sintering can effectively take place because of the hydrate layer of the sintering aid added in process D.

The calcination is performed at a temperature within the limits corresponding to the heat resistance of the thin platelet-like substrate used. For example, when using mica, calcination is performed at a temperature in the vicinity of 800° C.; while in the case of metal and other flakes, which have a low heat resistance, the temperature is suitably selected within the limits corresponding to the material in question.

In this way, the iridescent pigment obtained according to the present invention is characterized in that the pore amount (ml/m$^2$) is 0.006 ml/m$^2$ or less and has a specific surface area (BET) of 10 m$^2$/g or less. Therefore, the coated metal oxide particles are small and the surface of the coated layer is smooth and uniform. According to observation through a scanning electron microscope (SEM), the diameter of the metal oxide particles is characterized in that it is 50 nm or less. In the present specification, the "pore amount" is a value obtained by dividing the total pore volume (ml/g) measured with an Autosorb 6 (manufactured by Yuasa-ionics) by the specific surface area (BET) (m$^2$/g) of the thin platelet-like substrates.

Moreover, porosity (%) P is calculated from the total pore volume {porosity=100×total pore volume/(total pore volume+(amount of coated metal oxide (wt. %)/density (g/ml)))}; and the refractive index can be calculated according to the formula {$n_p^2$=(n$^2$−1) (1−P/100)+1, wherein $n_p$ indicates the calculated refractive index, n indicates the true refractive index and P indicates the porosity (%)} of the relationship between the refractive index and the porosity according to Yoldus (B. E. Yoldus, Appl. Opt., 19, p. 1425 (1980) and Kawahara (The Chemical Society of Japan, Japan Scientific Societies Press, The Chemical Review "Surface Reforming", No. 44, 1984, pp. 139–146). When calculating the refractive index of the iridescent pigment obtained by the present invention according to this formula, a high value of 2.33 or more is obtained by approximating all constituting components of the coated metal oxides with the principal component of the coated metal oxides TiO$_2$ (true density d: 4.27, true refractive index n: 2.7).

The iridescent pigment thus obtained can be used in decoration in various fields, paints, plastics, inks, printing, cosmetics, paint for security, ink for security, or incorporation to plastic for security, dopants for laser marking, non-dusting pigment products, non-dusting pigment granules and other types of applications.

Above all, the iridescent pigment obtained according to the present invention is advantageous in the painting sector, where, when applied to thin platelet-like substrates with fine particle diameter, particle feeling does not occur in the painted film and where, because of the high brilliance and high chroma, particle feeling in the painting is not desirable, and in sectors in which the particle size is restricted such as in inks for offset printing and writing appliances. The pearl-luster pigments obtained according to the present invention produce a sense of depth and can be applied to the security sector (printing, plastic sealing) etc. The iridescent pigment obtained according to the present invention can also be used for coating onto the surface of commonly known organic pigments (e.g., those given below), dyes, lake pigments and inorganic pigments by mechanochemical means in order to produce a new color material (e.g., JP-A-05-214257). Vivid colors can be obtained by combining interference colors produced by the interference effect with the inherent colors resulting from the absorption by these pigments and dyes.

By applying various types of additional surface treatments, the iridescent pigment obtained according to the present invention can also be used to produce pigments meeting the quality requirements corresponding to these applications. For example, it is possible to carry out treatments for light resistance, water resistance and weather resistance required of paints for outdoor applications and of paints for the automobile industry, etc. (e.g., JP-A-63-130673, JP-A-1-292067, etc.), treatments to impart high orientation properties (leafing) required e.g. in the painting and printing sectors (e.g., JP-A-2001-106937, JP-A-2001-164150, JP-A-2001-220522, etc.), water-borne treatments for water-borne paints or inks (e.g. JP-A-08-283604, etc.), silicon treatment for improving dispersibility and hydrogen-polysiloxane treatment for improving hydrophobic and oleophobic properties for applications in the cosmetics sector, surface treatments for weld-line prevention when used as resin (e.g. JP-A-03-100068), and various types of treatments for improving dispersibility (e.g. JP-A-08-283604).

Use examples of the iridescent pigment obtained according to the present invention Hereinafter, the iridescent pigment obtained according to the present invention and the use of the various types of treated pigments mentioned above will be described in detail. The iridescent pigment obtained according to the present invention can be used in various applications such as paints, printing inks, resin compositions, cosmetics, dopants for laser marking, non-dusting pigment products and non-dusting pigment granules, etc. It is particularly advantageous in sectors in which the particle size is restricted, because color properties (chroma and brilliance) are high with fine particle diameters, and in sectors in which particle sensitivity is not desired. Although not particularly mentioned, the iridescent pigments according to the present invention used in the following examples include also the products prepared by applying the various types of treatments mentioned above.

(1) Use for Paints

Examples of use in paints are organic solvent-type paints, NAD (non-aqueous dispersion) paints, water-borne paints, emulsion paints, colloidal paints and powder paints. The iridescent pigment according to the present invention is advantageous for automobile paints, etc., where particle sensitivity is not desired, because coloration (chroma) is high with fine particle diameters. For paint applications outdoors and in the automobile industry, it is preferred to use pigments treated for light resistance, water resistance and weather resistance.

The iridescent pigment according to the present invention can be mixed in a proportion of 1 to 100 weight parts for 100 weight parts of the paint resin as solid parts. A proportion of 1–70 wt. % is preferred. A proportion of 1–20 wt. % is particularly preferable. For improving dispersibility the surface of the pigments in the present invention can be treated with a silane coupling agent and a titanium coupling agent. Examples of resin components for the paints in the present invention are acrylate resins, alkyd resins, unsaturated polyester resins, amino resins, melamine resins, polyurethane resins, epoxy resins, polyamide resins, phenol resins, cellulose resins, vinyl resins, silicone resins, fluorine resins, etc. These resins may be used alone or in combination of two or more. For water-borne paint, emulsion-type resins comprising cross-linking acrylate melamine resin can be given as example.

Examples of mixtures and admixtures for paints include combination pigments, antisagging agent, viscosity adjusting agents, sedimentation preventers, cross-linking promoters, curing agents, leveling agents, defoaming agents, plasticizers, antiseptic agents, antifungal agents, ultraviolet stabilizers, etc. Examples of combination pigments are titanium dioxide; calcium carbonate; clay; talc; barium sulfate; white carbon; chromium oxide; zinc oxide; zinc sulfide; zinc powder; metal powder pigments; metal flake pigments (such as aluminum flakes, colored aluminum flakes, stainless steel flakes, titanium flakes, etc.); anti-corrosive metal flakes (such as base flakes of aluminum flake substrates); metal oxide coated metal flakes (such as titanium oxide or iron oxide coated aluminum flakes); iron black; yellow iron oxide; red iron oxide; chrome yellow; carbon black; molybdate orange; Prussian Blue; ultramarine blue; cadmium type pigments; fluorescent pigments; soluble azo dyes; insoluble azo dyes; condensed azo dyes; phthalocyanine pigments; condensed polycyclic pigments; composite oxide pigments; graphite; mica (such as muscovite, phlogopite, synthetic mica, fluorine tetra silicon mica, etc.); metal oxide coated mica (such as titanium oxide coated mica, titanium dioxide coated mica, (hydrated) iron oxide coated mica, mica coated with iron oxides and titanium oxides, mica coated with lower ordered titanium oxides); metal oxide coated graphite (such as titanium dioxide coated graphite, etc.), thin platelet-like alumina; metal oxide coated thin platelet-like alumina (such as titanium dioxide coated thin platelet-like alumina, iron oxide coated thin platelet-like alumina, $Fe_2O_3$ coated thin platelet-like alumina, $Fe_3O_4$ coated thin platelet-like alumina, interference color metal oxide coated thin platelet-like alumina, etc.); metal flake pigments (such as aluminum flakes, colored aluminum flakes, stainless steel flakes, titanium flakes, etc.); anti-corrosive metal flakes (such as base flakes of aluminum flake substrates); metal oxide coated metal flakes (such as titanium oxide or iron oxide coated aluminum flakes); MIO; metal oxide coated MIO; metal oxide coated silica flakes and metal oxide coated glass flakes called optical effect pigments (effect pigments). Other examples are photochromic pigments, thermochromic pigments and holographic pigments called functional pigments etc. By combining these and other pigments, novel hues and chromatic properties can be improved. These paints can be applied to wood, plastic, metal sheet plate, glass, ceramic, paper, film, sheets, translucent films of reflectors for LCDs, etc. Examples of uses for paints include automobiles, buildings, marine vessels, electric household appliances, canned goods, industrial equipment, traffic signs, plastic, household goods, etc.

Examples of the structure of the coated paint film include e.g. a film coated in the order of: base coat layer, middle coat layer, layer containing the pigments of the present invention and clear layer; and in the order of: base coat layer, middle coat layer containing the pigments of the present invention and clear layer, etc.; however, the structure of the coated film is not limited thereto.

Examples of the method for forming the coated paint film are one-coat/one-bake, two-coat/one-bake, two-coat/two bake, three-coat/one-bake, three-coat/two-bake, three-coat/three-bake, etc. Examples of coating methods include electrostatic coating, spray coating, airless coating, roll coating, dip coating, etc. The coated paint films thus obtained have high brilliance and high chroma.

(2) Use for Printing Inks

The iridescent pigment according to the present invention can be used as printing ink. Examples of printing inks include letter Press ink, offset printing ink, intaglio printing ink, ink for metal plates, radiation curable ink, UV ink, EB ink, flexo ink, screen ink, offset ink, gravure ink, etc. and water-borne inks thereof, etc. The iridescent pigment according to the present invention is particularly advantageous for offset ink where color properties (chroma, brilliance) are high with fine particle diameters. And since its color properties are high with fine particles, it is also advantageous for ink of writing appliances. The iridescent pigment according to the present invention can be mixed in a proportion of 1 to 100 weight parts for 100 weight parts of the solid resins parts in the ink. A proportion of 1–70 wt. % is preferred. A proportion of 1–20 wt. % is particularly preferable. Moreover, the surface of the pigments in the present invention can be treated with silane coupling agents and titanium coupling agents, etc. Examples of resin components include e.g. maleic rosin resins, maleic resins, alkyd resins, polyamide resins, phenol resins, petroleum resins, urethane resins, epoxy resins, acrylate resins, butyral resins, melamine resins, epoxy resins, vinyl chloride resins, vinylidene chloride resins, cellulose resins, vinyl resins, unsaturated polyester resins, cellulose resins, etc. These resins may be used alone or in combination of two or more.

Examples admixed in ink include combination pigments and additives such as varnishes, reducers, compounders, extra varnishes, gelling agents, drying promoters, antioxidants, anti-offsetting agents, lubricants, surface active agents, etc. Further examples include antisagging agent, viscosity adjusting agents, sedimentation preventers, cross-linking agents, curing agents, leveling agents, defoaming agents, plasticizers, antiseptic agents, antifungal agents, ultraviolet stabilizers, etc.

Examples of combination pigments are body pigments; precipitated barium sulfate; precipitated calcium carbonate; alumina white; magnesium carbonate and white carbon; white pigments such as titanium oxide, white zinc, etc.; black pigments such as carbon black; yellow pigments such as chrome yellow, disazo yellow, Hansa yellow; red pigments such as brilliant carmine 6B, lake red C, permanent red F5R, Rhodamine Lake, etc.; blue pigments such as phthalocyanine blue, Victoria Blue Lake, Prussian Blue; orange pigments such as chrome vermilion, disazo orange; green pigments such as phthalocyanine green, etc.; violet pigments such as methyl violet lake, dioxazine violet, etc.; other pigments such as isoindolinone, benzimidazoline, condensed azo, quinacdrine, etc.; composite oxide pigments; graphite; mica (such as muscovite, phlogopite, synthetic mica, fluorine tetra silicon mica, etc.); metal oxide coated mica (such as titanium oxide coated mica, titanium dioxide coated mica, (hydrated) iron oxide coated mica, mica coated with iron oxides and titanium oxides, mica coated with lower ordered titanium oxides); metal oxide coated graphite (such as titanium dioxide coated graphite, etc.), thin platelet-like alumina; metal oxide coated thin platelet-like alumina (such as titanium dioxide coated thin platelet-like alumina, iron oxide coated thin platelet-like alumina, $Fe_2O_3$ coated thin platelet-like alumina, $Fe_3O_4$ coated thin platelet-like alumina, interference color metal oxide coated thin platelet-like alumina, etc.); metal flake pigments (such as aluminum flakes, colored aluminum flakes, stainless steel flakes, titanium flakes, etc.); anti-corrosive metal flakes (such as base flakes of aluminum flake substrates); metal oxide coated metal flakes (such as titanium oxide or iron oxide coated aluminum flakes); MIO; metal oxide coated MIO; metal oxide coated silica flakes and metal oxide coated glass flakes called optical effect pigments (effect pigments). Other examples are photochromic pigments, thermochromic pigments and holographic pigments called functional pigments etc. These inks can be printed on wood, plastic, metal sheet plate, glass, ceramic, paper, corrugated cardboard, film, sheets, canned goods, translucent films of reflectors for LCDs, etc. Novel hues and functions can be uncovered as a result of combining these pigments etc. with the pigments according to the present invention. In particular, the iridescent pigment according to the present invention is advantageously used for preventing the counterfeiting of securities, tickets, travel coupons and passenger tickets, etc.

Moreover, when the iridescent pigments according to the present invention are used in printing inks, it is preferred to perform a high orientation treatment (mentioned above) especially on interference pigments having metallic luster obtained according to the present invention. Pigments that have been subject to such a surface treatment can be mixed with various types of printing inks and used for offset printing, gravure printing, screen printing, ultraviolet cure printing, relief and intaglio printing. According to the present invention, the use of iridescent pigments that have been subject to high orientation treatment as inks makes it possible to improve especially the coloration of interference colors on the printing surface and is preferred for preventing counterfeiting in printing.

The writing appliance industry is an example for the use as ink of the pigments according to the present invention. Particularly, it can be used in felt pens, etc. in which the particle size is restricted. Printed matter obtained in this way has high brilliance and high chroma.

(3) Use for Plastics

The iridescent pigments according to the present invention, when incorporated in plastics, can be mixed with the resin, either directly or after it has been formed into pellets, before being formed into various types of molded products by means of extrusion molding, calender molding, blow molding, etc. As to the resin component, polyolefin-based thermoplastic resins as well as epoxy-based, polyester-based and polyamide (nylon)-based thermoplastic resins can be used. A small amount of pigments can be sufficient to effectively produce the color effects of the iridescent pigments of the present invention, e.g., when forming a multiple layer plastic bottle, the external appearance of the bottle can be made to appear effectively by incorporating the pigments in the resin of the outer layer. Especially pigments obtained according to the present invention on which an additional orientation treatment has been performed (as described above) are preferred in that they have good coloring properties. Naturally, it is also possible to use a weld-line prevention surface treated (such as encapsulation etc.) on the iridescent pigments according to the present invention.

The iridescent pigments according to the present invention can also be used in combination with other pigments. Examples of pigments that can be used in combination with the pigments of the present invention include titanium dioxide; calcium carbonate; clay; talc; barium sulfate; white carbon; chromium oxide; zinc oxide; zinc sulfide; zinc powder; metal powder pigments; iron black; yellow iron oxide; red iron oxide; chrome yellow; carbon black; molybdate orange; Prussian Blue; ultramarine blue; cadmium type pigments; fluorescent pigments; soluble azo dyes; insoluble azo dyes; condensed azo dyes; phthalocyanine pigments; condensed polycyclic pigments; composite oxide pigments; graphite; metal powder pigments; mica (such as, muscovite, phlogopite, synthetic mica, fluorine tetra silicon mica, etc.), metal oxide coated mica (such as titanium oxide coated mica, titanium dioxide coated mica, (hydrated) iron oxide coated mica, mica coated with iron oxides and titanium oxides, mica coated with lower ordered titanium oxides); metal oxide coated graphite (such as titanium dioxide coated graphite, etc.), thin platelet-like alumina; metal oxide coated thin platelet-like alumina (such as titanium dioxide coated thin platelet-like alumina, iron oxide coated thin platelet-like alumina, $Fe_2O_3$ coated thin platelet-like alumina, $Fe_3O_4$ coated thin platelet-like alumina, interference color metal oxide coated thin platelet-like alumina, etc.); metal flake pigments (such as aluminum flakes, colored aluminum flakes, stainless steel flakes, titanium flakes, etc.); anti-corrosive metal flakes (such as base flakes of aluminum flake substrates); metal oxide coated metal flakes (such as titanium oxide or iron oxide coated aluminum flakes); MIO; metal oxide coated MIO; metal oxide coated silica flakes and metal oxide coated glass flakes called optical effect pigments (effect pigments). Other examples are photochromic pigments, thermochromic pigments, conductive pigments and holographic pigments called functional pigments, etc. The resin products obtained in this way have high brilliance and high chroma.

(4) Use for Cosmetics

The iridescent pigments according to the present invention can be used in make-up, hair care products, cosmetic packs, etc. The pigments can be used for example in gel, lipstick, foundation (including emulsion, liquid, oil-type emulsions, etc.), cheek rouge, mascara, nail enamel, eyebrow pencil, eye shadow, eye liner, hair products, etc. The iridescent pigments according to the present invention can be used in a proportion of, for example, 1 to 50 wt. % for foundations, 1 to 80 wt. % for eye shadow, 1 to 40 wt. % for lipstick and 0.1 to 20 wt. % for nail enamel and up to 100 wt. % for press powders.

Examples of other mixed components will be given below. Examples of pigments that can be used in combination with the pigments of the present invention include titanium dioxide; calcium carbonate; clay; talc; barium sulfate; white carbon; chromium oxide; zinc oxide; zinc sulfide; zinc powder; metal powder pigments; iron black; yellow iron oxide; red iron oxide; chrome yellow; carbon black; molybdate orange; Prussian Blue; ultramarine blue; cadmium type pigments; fluorescent pigments; soluble azo dyes; insoluble azo dyes; condensed azo dyes; phthalocyanine pigments; condensed polycyclic pigments; composite oxide pigments; graphite; metal powder pigments; mica (such as, muscovite, phlogopite, synthetic mica, fluorine tetra silicon mica, etc.), metal oxide coated mica (such as titanium oxide coated mica, titanium dioxide coated mica, (hydrated) iron oxide coated mica, mica coated with iron oxides and titanium oxides, mica coated with lower ordered titanium oxides); metal oxide coated graphite (such as titanium dioxide coated graphite, etc.), thin platelet-like alumina; metal oxide coated thin platelet-like alumina (such as titanium dioxide coated thin platelet-like alumina, iron oxide coated thin platelet-like alumina, $Fe_2O_3$ coated thin platelet-like alumina, $Fe_3O_4$ coated thin platelet-like alumina, interference color metal oxide coated thin platelet-like alumina, etc.); metal flake pigments (such as aluminum flakes, colored aluminum flakes, stainless steel flakes, titanium flakes, etc.); anti-corrosive metal flakes (such as base flakes of aluminum flake substrates); metal oxide coated metal flakes (such as titanium oxide or iron oxide coated aluminum flakes); MIO; metal oxide coated MIO; metal oxide coated silica flakes and metal oxide coated glass flakes called optical effect pigments (effect pigments). Other examples are photochromic pigments, thermochromic pigments and holographic pigments called functional pigments, etc. Further examples are sericite, magnesium carbonate, silica, zeolite, hydroxyapatite, chromium oxide, cobalt titanate, glass beads, nylon beads, silicone beads, etc.

Examples of organic pigments used as combination pigments include red nos. 2, 3, 102, 104, 105, 106, 201, 202, 203, 204, 205, 206, 207, 208, 213, 214, 215, 218, 219, 220, 221, 223, 225, 226, 227, 228, 230-1, 230-2, 231, 232, 405; yellow nos. 4, 5, 201, 202-1, 202-2, 203, 204, 205, 401, 402, 403, 404, 405, 406, 407; green nos. 3, 201, 202, 204, 205, 401, 402; blue nos. 1, 2, 201, 202, 203, 204, 205, 403, 404; orange nos. 201, 203, 204, 205, 206, 207, 401, 402, 403; brown no. 201; violet nos. 201, 401; black no. 401. Examples of natural colors include salol yellow, carmine, β-carotin, hibiscus color, capsaicin, carminic acid, laccaic acid, gurcumin, riboflavin, shikonin, etc.

Further, examples of other components include fats and oils, waxes, surfactants, oxidation inhibitors, UV absorbers, vitamins, hormones, squalanes, liquid paraffins, palmitic acids, stearic acids, bees wax, myristyl myristate and other esters; acetone, toluene, butyl acetate, acetic ester and other solvents; antioxidants, antiseptic agents, polyhydric alcohols, perfumes, etc. Novel hues and functions can be uncovered as a result of combining these pigments etc. with the pigments according to the present invention.

When used in cosmetics, the pigments according to the present invention can be used for example in compact cakes, cream, lipstick, etc.; however, they are particularly effective when used in make-up, wherein colors are particularly important. Naturally, it is equally possible to use iridescent pigments related to the present invention on which a surface treatment (mentioned above) has been performed beforehand. The cosmetic products obtained in this way have high brilliance and high chroma.

(5) Other Uses

The iridescent pigments of the present invention can be used by combining them with color toners for copying machines, etc. Applications in this field are preferred because they require high coloration with fine particles.

They can also be used for dopants for laser marking, non-dusting pigment products and non-dusting pigment granules.

Hereinafter, examples according to the present invention will be given which, however, are not intended to limit the present invention.

EXAMPLES

Example 1

180 g of fine-mica powder of 1 to 15 μm (average particle diameter: 5.5 μm) were suspended in 1.5 liters of deionized water. 2 g of polyethylene glycol 400 (PEG 400) was added while stirring. The suspension was heated to 85° C. while stirring. An aqueous solution of sodium hydroxides and, 440 ml of an aqueous solution of $SnCl_4$ with its concentration of 70 g/l containing hydrochloric acid were simultaneously added at a rate of 3.2 ml/min, while maintaining the pH at 1.9. Further, an aqueous solution of sodium hydroxides and, 700 ml of an aqueous solution of $TiCl_4$ with its concentration of 403 g/l were simultaneously added at a rate of 3.4 ml/min, while maintaining the pH at 1.6. Then, the pH was adjusted to 9.0 by adding sodium hydroxide. Thereafter, the metal hydrate coated mica was filtered from the suspension and washed, the filtrate was dried at 105° C. and calcined at 850° C. and the silver iridescent pigments were obtained.

SEM observation confirmed that the diameter of the coated particles was 50 nm or less.

Example 2

120 g of fine-mica powder of 1 to 15 μm (average particle diameter: 6.4 μm) were suspended in 1.5 liters of deionized water. 1 g of polyethylene glycol 200 (PEG 200) was added while stirring. The suspension was heated to 85° C. while stirring. An aqueous solution of sodium hydroxides and, 100 ml of an aqueous solution of $SnCl_4$ with its concentration of 70 g/l containing hydrochloric acid were simultaneously added at a rate of 2.5 ml/min, while maintaining the pH at 2.0. Further, an aqueous solution of sodium hydroxides and, 450 ml of an aqueous solution of $TiCl_4$ with its concentration of 403 g/l were simultaneously added at a rate of 2.0 ml/min, while maintaining the pH at 1.6. An aqueous solution of sodium hydroxides and, 100 ml of an aqueous solution of $SnCl_4$ with its concentration of 70 g/l containing hydrochloric acid were simultaneously added at a rate of 2.5 ml/min, while maintaining the pH at 1.6. Further, an aqueous solution of sodium hydroxides and, an aqueous solution of $TiCl_4$ with its concentration of 420 g/l were simultaneously added at a rate, of 2.7 ml/min, while maintaining the pH at 1.6. The adding of this aqueous solution of $TiCl_4$ was stopped at the end point at which the color turned to silver. Thereafter, 4.0 g of $MgCl_2·6H_2O$ and 8 g of $CaCl_2·2H_2O$ were added. Then, the pH was adjusted to 9.0 by adding an aqueous solution of sodium hydroxide. Thereafter, the metal hydrate coated mica was filtered from the suspension and washed, the filtrate was dried at 105° C. and calcined at 800° C. (850° C.) and the iridescent pigments were obtained. SEM observation confirmed that the diameter of the coated particles was 50 nm or less.

Example 3

120 g of fine-mica powder of 5 to 25 μm (average particle diameter: 8.5 μm) were suspended in 1.5 liters of deionized water. The suspension to which 1 g of polyethylene glycol 200 (PEG 200) and 0.5 g of polyethylene glycol 400 (PEG 400) had been added while stirring was heated to 85° C. while stirring. An aqueous solution of sodium hydroxides and, 200 ml of an aqueous solution of $SnCl_4$ with its concentration of 70 g/l containing hydrochloric acid were simultaneously added at a rate of 2.0 ml/min, while maintaining the pH at 2.0. Further, an aqueous solution of sodium hydroxides and, 350 ml of an aqueous solution of $TiCl_4$ with its concentration of 408 g/l were simultaneously added at a rate of 1.3 ml/min, while maintaining the pH at 1.6. Then, the pH was adjusted to 9.0 by adding an aqueous solution of sodium hydroxide. Thereafter, the metal hydrate coated mica was filtered from the suspension and washed, the filtrate was dried at 105° C. and calcined at 850° C. and the silver iridescent pigments were obtained. SEM observation confirmed that the diameter of the coated particles was 50 nm or less.

Example 4

120 g of fine-grained mica powder of 5 to 25 μm (average particle diameter: 8.5 μm) were suspended in 1.5 liters of deionized water. 1 g of polyethylene glycol 200 (PEG 200) and 0.5 g of polyethylene glycol 400 (PEG 400) were added while stirring. The suspension was heated to 85° C. while stirring. A solution in which 5 g of cerous chloride 7 hydrates were dissolved in 200 ml of water was dropped into the suspension at a rate of 3 ml/min while adjusting the pH to 7.0 with a 32% aqueous solution of sodium hydroxide. A solution in which 4.0 g $CaCl_2 \cdot 2H_2O$ and 2.0 g $MgCl_2 \cdot 6H_2O$ were dissolved in 100 ml of an aqueous solution of $SnCl_4$ with its concentration of 70 g/l containing hydrochloric acid was added at a rate of 2.5 ml/min while maintaining the pH at 2.0 by simultaneously using an aqueous solution of sodium hydroxide. Further, an aqueous solution of sodium hydroxides and, an aqueous solution of $TiCl_4$ with its concentration of 408 g/l were simultaneously added at a rate of 1.3 ml/min, while maintaining the pH at 1.6. Then, a solution in which 4 g of calcium chloride 2 hydrates and 2 g of magnesium chloride 6 hydrates were dissolved in 100 ml of an aqueous solution of $SnCl_4$ with its concentration of 70 g/l containing hydrochloric acid was added at a rate of 2.0 ml/min while maintaining the pH at 2.0 by simultaneously using an aqueous solution of sodium hydroxide. Further, an aqueous solution of sodium hydroxides and, an aqueous solution of $TiCl_4$ with its concentration of 408 g/l were simultaneously added at a rate of 1.2 ml/min, while maintaining the pH at 1.6. The adding of this aqueous solution of $TiCl_4$ was stopped at the end point at which the color turned to silver. Then, the pH was adjusted to 9.0 by adding an aqueous solution of sodium hydroxide. Thereafter, the metal hydrate coated mica was filtered from the suspension and washed, the filtrate was dried at 105° C. and calcined at 870° C. and the iridescent pigments were obtained. SEM observation confirmed that the diameter of the coated particles was 50 nm or less.

Example 5

122 g of fine-mica powder of 1 to 15 μm (average particle diameter: 6.4 μm) were suspended in 1.75 liters of deionized water. 1 g of polyethylene glycol 200 (PEG 200) was added while stirring. The suspension was heated to 85° C. while stirring. An aqueous solution of sodium hydroxides and, 200 ml of an aqueous solution of $SnCl_4$ with its concentration of 70 g/l containing hydrochloric acid were simultaneously added at a rate of 2.8 ml/min, while maintaining the pH at 2.0. Further, an aqueous solution of sodium hydroxides and, 650 ml of an aqueous solution of $TiCl_4$ with its concentration of 388 g/l were simultaneously added at a rate of 2.7 ml/min, while maintaining the pH at 1.6. An aqueous solution of sodium hydroxides and, 200 ml of an aqueous solution of $SnCl_4$ with its concentration of 70 g/l containing hydrochloric acid were simultaneously added at a rate of 2.8 ml/min, while maintaining the pH at 1.6. Further, an aqueous solution of sodium hydroxides and, an aqueous solution of $TiCl_4$ with its concentration of 420 g/l were simultaneously added at a rate of 2.5 ml/min, while maintaining the pH at 1.6. The adding of this aqueous solution of $TiCl_4$ was stopped at the point at which the color turned to a blue interference color. Thereafter, 2.5 g of $MgCl_2 \cdot 6H_2O$ and 5 g of $CaCl_2 \cdot 2H_2O$ were added. Then, the pH was adjusted to 9.0 by an aqueous solution of adding sodium hydroxide. Thereafter, the metal hydrate coated mica was filtered from the suspension and washed, the filtrate was dried at 105° C. and calcined at 800° C. and the iridescent pigments were obtained. SEM observation confirmed that the diameter of the coated particles was 50 nm or less.

Example 6

Fine mica (17.5 kg) particle having 1~15 μm in the particle size was suspended in 250 l of deionized water. 120 g of PEG#200 was added to the suspension under stirring. The suspension was heated up to 85° C. with stirring, 37.6 l of aqueous solution of $SnCl_4$ (53 g/l) containing HCl solution was added at the rate of 527 ml/min to the suspension in controlling the pH 1.6 by simultaneous addition of aqueous NaOH solution.

35 l of aqueous solution of $TiCl_4$ (420 g/l) was added at the rate of 356 ml/min to the suspension in controlling the pH 1.6 by simultaneous addition of aqueous NaOH solution. Then 37.6 l of aqueous solution of $SnCl_4$ (53 g/l) containing HCl solution was added at the rate of 527 ml/min to the suspension in controlling the pH 1.6 by simultaneous addition of aqueous NaOH solution. After adding the aqueous solution of $SnCl_4$ the aqueous solution of $TiCl_4$ (420 g/l) was added at the rate of 356 ml/min to the suspension in controlling the pH 1.6 by simultaneous addition of aqueous NaOH solution.

After reaching to end point of Blue.

10 l of aqueous of 0.35 kg of $MgCl_2 \cdot 6H_2O$ and 0.71 kg of $CaCl_2 \cdot 2H_4O$ was added to the suspension. The pH value of the suspension was controlled pH 9.0 by adding aqueous NaOH solution. The suspension containing mica coated with metal hydroxide was filtrated and washed by deionized water. The filter cake was dried at 105° C. and the dried product was calcinated at 770° C.

After the calcinated product was sieved by 63 μm sieve, the coating paper for measuring of L.a.b. and Chrome of the produced pigment was prepared as follows:

0.5 g of pigment with interference blue was added into 9.5 g of lacquer of nitrocellulose and it is spread on a testing paper of hiding power by barcoder No. 20. (L.a.b. values on black ground were measured by Minolta color analyzer model CR-300).

The chroma of interference Blue pigments was 37.8

TABLE 1

| Sample | Average particle dia. (μm) | Specific surface area (m$^2$/g) | Pore amount (ml/m$^2$) | Porosity (%) | Y value (×10$^3$) | Hiding power ratio (%) | Total pore volume (ml/g) |
|---|---|---|---|---|---|---|---|
| Example 6 | 8.3 | 8.2 | 0.0024 | 10.7 | 9.6 | 0.12 | 0.0197 |

TABLE 2

| Sample | Average particle dia. (μm) | L value | a value | b value | C (Chroma) $\sqrt{(a^2 + b^2)}$ | Hue angle ($\tan^{-1}(b/a)$) |
|---|---|---|---|---|---|---|
| Example 6 | 8.3 | 36.2 | 11.1 | −35.3 | 37.8 | 287.0 |

Comparative Example 1

Pigments were prepared under the same conditions as in Example 1, except that polyethylene glycol 400 (PEG 400) was not added to the suspension of fine-mica powder.

(A) Measurement of the Average Particle Diameter

The average particle diameter was measured with a Master Sizer 2000.

(B) Measurement of the Specific Surface Area and the Total Pore Volume

The specific surface area was measured with an Autosorb 6 (manufactured by Yuasa-ionics) according to the B.E.T method.

The pore amount is a value obtained by dividing the total pore volume by the specific surface area of the thin platelet-like substrates (refer to paragraph (0034)).

(C) Porosity is Calculated According to the Following Formula from the Total Pore Volume, the True Density of Titanium Oxide (4.27) and the Weight Percentage of that Coated Metal Oxide $$\text{Porosity (\%)} = \frac{\text{total pore volume (ml/g)}}{\frac{\text{coated metal oxide weight (\%)} \times 0.01}{\text{coated metal oxide density (g/ml)}} + \text{total pore volume (ml/g)}} \times 100 \quad \text{(Formula 2)}$$

(D) Measurement of Brilliance

Brilliance of pigments was compared by measuring the reflectance (value Y; this value increases with increasing brilliance) of the pigments. The measurements were conducted as follows. Namely, the pigments were dispersed by using a nitrocellulose lacquer so as to achieve a concentration of 3 wt. %, draw-down cards were prepared and the value Y was measured at an incident angle of 45° and a measurement angle of 45° by using a goniospectrophotometer GCMS-3 (manufactured by Murakami Color Research Laboratory).

(E) Hiding Power Ratio

The hiding power ratio is expressed as a percentage value obtained by dividing the value Y on a black background by the value Y on a white background, both measured with a Minolta color meter (CR 300).

The results are shown in Table 3.

TABLE 3

| Sample | Average particle dia. (μm) | Specific surface area (m²/g) | Pore amount (ml/m²) | Porosity (%) | Y value (×10³) | Hiding power ratio (%) | Total pore volume (ml/g) |
|---|---|---|---|---|---|---|---|
| Example 1 | 6.0 | 9.4 | 0.0058 | 28.5 | 8.2 | 0.33 | 0.038 |
| Example 2 | 7.4 | 4.7 | 0.0028 | 15.7 | 9.1 | 0.36 | 0.013 |
| Example 3 | 10.3 | 9.5 | 0.0030 | 28.5 | 8.5 | 0.38 | 0.030 |
| Example 4 | 10.5 | 3.1 | 0.0020 | 11.9 | 10.5 | 0.43 | 0.042 |
| Comp. Example 1 | 6.0 | 12.6 | 0.0061 | 30.5 | 7.2 | 0.34 | 0.042 |
| Iriodin ® 111 | 6.3 | 12.4 | 0.0065 | 32.0 | 6.3 | 0.34 | 0.047 |
| Iriodin ® 121 | 10.9 | 9.0 | 0.0083 | 32.0 | 7.8 | 0.26 | 0.039 |
| Iriodin ® 123 | 11.0 | 10.0 | 0.0074 | 30.0 | 8.3 | 0.29 | 0.039 |

Iriodin ® 111: Silver pearl-luster pigment with a single layer coat of rutile-type TiO₂ of an average particle diameter of 6.3 μm manufactured by Merck KGaA, Darmstadt.
Iriodin ® 121: Silver pearl-luster pigment with a single layer coat of rutile-type TiO₂ of an average particle diameter of 10.9 μm manufactured by Merck KGaA, Darmstadt.
Iriodin ® 123: Silver pearl-luster pigment with a single layer coat of rutile-type TiO₂ of an average particle diameter of 11.0 μm manufactured by Merck KGaA, Darmstadt.

Compared to conventional pigments, the pigments obtained according to the present invention had a high Y value (a high Y value shows high brilliance) even with fine particle diameters (in particular Examples 1 and 2) and a high hiding power ratio. The fact that the hiding power ratio was high also confirms that the brilliance was also high.

A comparison of the silver color confirmed that, compared to the conventional Iriodin® pigments with an equivalent level of average particle diameter, the pigments obtained in Examples 1 to 4 had all higher Y values and higher brilliance.

(F) Measurement of Chroma

The chroma of the pigments of the present invention and commercially available pigments was measured as follows.

The pigments were dispersed in nitrocellulose lacquer so as to achieve a concentration of 5 wt. %, draw-down cards were prepared and the chroma was measured by using a Minolta color meter (CR 300).

The results are shown in Table 4.

TABLE 4

| Sample | Average particle dia. (μm) | L value | a value | b value | C (Chroma) $\sqrt{(a^2 + b^2)}$ | Hue angle $(\text{Tan}^{-1}(b/a))$ |
|---|---|---|---|---|---|---|
| Example 5 | 8.0 | 40.1 | 6.5 | −36.4 | 37.0 | 280.0 |
| Micro Blue | 7.9 | 36.4 | 8.0 | −28.6 | 29.7 | 285.5 |
| Iriodin ® 221 | 10.8 | 38.9 | 3.8 | −29.5 | 29.7 | 277.3 |

Micro Blue: Pearl-luster pigments having a blue interference color with a single layer coat of $TiO_2$ of an average particle diameter of 7.9 manufactured by Engelhard.
Iriodin ® 221: Pearl-luster pigment having a blue interference color with a single layer coat of $TiO_2$ of an average particle diameter of 11.4 μm manufactured by Merck KGaA, Darmstadt.

From the results of Table 4 it can be observed that, compared to conventional pigments whose hues are in the blue range, the pigments of the present invention (Example 5) comprising a 2 layer structure of tin oxide and titanium oxide respectively had a higher chroma.

Exemplary Formulations

Hereinafter, specific examples of the use of pigments will be given.

Use Example 1

| Paint based on pearl-luster pigments | |
|---|---|
| (Composition A) | |
| Acrydic 47-712 | 70 weight parts |
| Super Beckamine G821-60 | 30 weight parts |
| (Composition B) | |
| Iridescent pigment according to the present invention | 10 weight parts |
| Pearl-luster pigment | 10 weight parts |
| (Composition C) | |
| Ethyl acetate | 50 weight parts |
| Toluene | 30 weight parts |
| n-butanol | 10 weight parts |
| Solvesso #150 | 40 weight parts |

100 weight parts of Composition A were mixed with 20 weight parts of Composition B, the resulting mixture was diluted to obtain a viscosity (12 to 15 seconds with Ford Cup #4) suitable for spray-coating with Composition C, whereupon a basecoat was formed by spray coating.

| Acrydic 44-179 | 14 weight parts |
|---|---|
| Super Beckamine L117-60 | 6 weight parts |
| Toluene | 4 weight parts |
| Methyl isobutyl ketone (MIBK) | 4 weight parts |
| Butyl cellosolve | 3 weight parts |

This composition was coated on the above pearl-luster coating, dried at 40° C. for 30 minutes, air-dried at room temperature and baked at 130° C. for 30 minutes. The coated film obtained had high brilliance and high chroma.

Use Example 2 (Use Example for Plastic)

| High density polyethylene (pellets) | 100 weight parts |
|---|---|
| Iridescent pigment according to the present invention | 1 weight part |
| Magnesium stearate | 0.1 weight parts |
| Zinc stearate | 0.1 weight parts |

These components were dry-blended and formed by injection-molding.

These moldings had high brilliance and high chroma.

Use Example 3 (Use Example for Ink)

| CCST medium (nitrocellulose resin) | 10 weight parts |
|---|---|
| Iridescent pigment according to the present invention | 8 weight parts |

The solvent NC 102 was added to the ink composition blended from the above components, and ink with a viscosity of 20 seconds was prepared with Zahn Cup No. 3. Prints obtained with this ink had high brilliance and high chroma.

Use Example 4 (Use Example for Cosmetics)

(1) Use Example for Compact Powder

| Talc | 50 weight parts |
|---|---|
| Iridescent pigment according to the present invention | 25 weight parts |
| Color pigments | 5 weight parts |
| Isopropyl myristate | a suitable amount |
| Magnesium stearate | 2 weight parts |

(2) Use Example for a Foundation

| Talc | 38 weight parts |
|---|---|
| Iridescent pigment according to the present invention | 25 weight parts |
| Mica (8 μm) | 10 weight parts |

-continued

| | |
|---|---|
| Magnesium stearate | 3 weight parts |
| Nylon powder 12 | 8 weight parts |
| Yellow iron oxide | 1.9 weight parts |
| Red iron oxide | 0.8 weight parts |
| Titanium oxide | 1.0 weight part |
| Mineral oil | a suitable amount |
| (caprylic acid, capric acid) triglyceride | 3.3 weight parts |
| Butylparaben | 0.1 weight parts |

The cosmetics obtained had high brilliance and high chroma.

EFFECT OF THE INVENTION

The iridescent pigments according to the present invention have higher brilliance and higher chroma than conventional iridescent pigments, which effect is particularly confirmed in case of fine particle diameter. The iridescent pigments according to the present invention can be used for various types of applications such as painting, printing, ink for writing appliances, plastic sealing, cosmetics, etc.; among these applications their use is particularly advantageous in areas where high brilliance and high chroma are appreciated and a high designer value is required. Moreover, compared to conventional iridescent pigments, the iridescent pigments according to the present invention have high brilliance and high chroma even as iridescent pigments with fine particle diameter and can be used in sectors where the use is restricted due to particle diameter, for example in the painting sector where particle feeling is not desirable, and in sectors in which the particle size is restricted such as in inks for offset printing and writing appliances etc.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. Also, any preceding examples can be repeated with similar success by substituting the generically or specifically described reactants and/or operating conditions of this invention for those used in such examples.

Throughout the specification and claims, all temperatures are set forth uncorrected in degrees Celsius and, all parts and percentages are by weight, unless otherwise indicated.

The entire disclosures of all applications, patents and publications, cited herein and of corresponding Japanese application No. 2002-338344, filed Nov. 21, 2002, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An iridescent pigment comprising a platelet shaped substrate, and coated thereon (a) a layer adjacent to the substrate which layer is a metal oxide layer comprising one or more of Ce, Sn or Fe oxides, and wherein said pigment comprises one or more repeating set of metal oxide layers of Sn followed by Ti, or (b) a layer unit of Sn oxide and therein Ti oxide, said unit repeated one or more times.

2. An iridescent pigment according to claim 1, wherein the layer adjacent to the substrate is a metal oxide layer comprising Sn, and the layer thereon is a metal oxide layer comprising Ti.

3. An iridescent pigment according to claim 2, further comprising one or more repeating metal oxide layers of Sn followed by Ti.

4. An iridescent pigment according to claim 1, wherein a metal oxide layer comprises an alkali metal and/or an alkaline earth metal.

5. An iridescent pigment according to claim 4, wherein the alkaline earth metal is Mg and/or Ca.

6. An iridescent pigment according to claim 1, wherein the specific surface area is 10 $m^2/g$ or less.

7. An iridescent pigment according to claim 1, wherein the pore amount is 0.006 ml or less for each 1 $m^2$ of the surface area of the platelet shaped substrate.

8. An iridescent pigment according to claim 1, wherein the specific surface area is 10 $m^2/g$ or less and the pore amount is 0.006 ml or less for each 1 $m^2$ of the surface area of the platelet shaped substrate.

9. An iridescent pigment according to claim 1, wherein the platelet shaped substrate is mica, synthetic mica, silica flakes, alumina flakes, glass flakes, thin platelet-like iron oxide or metal flakes.

10. An iridescent pigment according to claim 1, wherein the average particle diameter of the substrate is 30 μm or less.

11. An iridescent pigment according to claim 1, wherein the average particle diameter of the substrate is 20 μm or less.

12. An iridescent pigment according to claim 1, wherein the average particle diameter of the substrate is 10 μm or less.

13. An iridescent pigment according to claim 1, comprising a layer sequence of metal oxide layers of Sn-Ti-Sn Ti.

14. An iridescent pigment according to claim 1, comprising a layer sequence of metal oxide layers of Fe-Sn-Ti-Sn-Ti.

15. An iridescent pigment according to claim 1, comprising a layer sequence of metal oxide layers of Fe-Sn-Fe/Ti.

16. An iridescent pigment according to claim 1, wherein the outermost layer is a sintered layer.

17. A method for preparing an iridescent pigment according to claim 1, comprising preparing a suspension, said suspension comprising platelet shaped substrates and one or more water-soluble polymers and/or water-soluble nitrogen compounds, followed by coating a metal hydrate layer onto the surface of the substrates by adding one or more metal salts and a basic aqueous solution to said suspension.

18. A method according to claim 17 comprising adding to the suspension one or more alkali metal compounds and/or alkaline earth metal compounds, optionally said one or more alkali metal compounds and/or alkaline earth metal compounds are in an aqueous solution when added to the suspension.

19. A method according to claim 17, wherein the water-soluble polymer is polyethylene glycol.

20. A method according to claim 17, wherein the water-soluble polymer is a water-soluble surfactant.

21. An iridescent pigment A method according to claim 17, wherein the water-soluble nitrogen compound is urea, buret, guanidine or a water-soluble amine.

22. A method according to claim 17, wherein the basic aqueous solution is sodium hydroxide or potassium hydroxide.

23. A method according to claim 17, wherein the metal salt is a secondary tin salt and no oxidizing agent is added to the suspension.

24. An iridescent pigment obtained by the method according to claim 17.

25. A paint, printing ink, lacquer, plastic article, dopant for laser marking, non-dusting pigment product, non-dusting pigment granule or cosmetic preparation comprising a pigment according to claim 1.

26. An iridescent pigment comprising a platelet shaped substrate and coated thereon (a) a layer adjacent to the substrate which layer is a metal oxide layer comprising one or more of Ce or Fe oxides, and wherein said pigment comprises one or more repeating set of metal oxide layers of Sn followed by Ti, or (b) a layer unit of Sn oxide and thereon Ti oxide, said unit repeated one or more times.

27. An iridescent pigment according to claim 26, comprising (a) a layer adjacent to the substrate which layer is a metal oxide layer comprising one or more of Ce or Fe oxides, and wherein said pigment comprises one or more repeating set of metal oxide layers of Sn followed by Ti.

28. An iridescent pigment comprising a platelet shaped substrate and coated thereon (a) a layer adjacent to the substrate which layer is a metal oxide layer comprising Ce oxide and wherein said pigment comprises one or more repeating set of metal oxide layers of Sn followed by Ti, or (b) a layer unit of Sn oxide and thereon Ti oxide, said unit repeated one or more times.

* * * * *

UNITED STATES PATENT AND TRADEMARK OFFICE
CERTIFICATE OF CORRECTION

PATENT NO. : 7,241,503 B2 Page 1 of 1
APPLICATION NO. : 10/717926
DATED : July 10, 2007
INVENTOR(S) : Tamio Noguchi It is certified that error appears in the above-identified patent and that said Letters Patent is hereby corrected as shown below:

Column 24, line 62 reads "An iridescent pigment A method according to" should read -- A method according to --

Signed and Sealed this

Fifteenth Day of April, 2008

JON W. DUDAS
*Director of the United States Patent and Trademark Office*